May 11, 1954
N. WALKER
2,678,082
AUTOMOBILE SEAT SHOCK ABSORBING SYSTEM
Filed Dec. 9, 1952
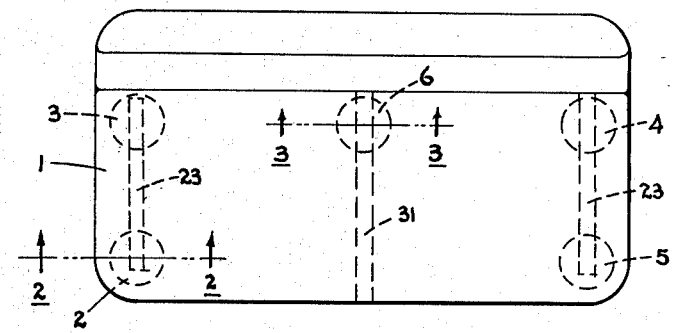
*Fig. 1*
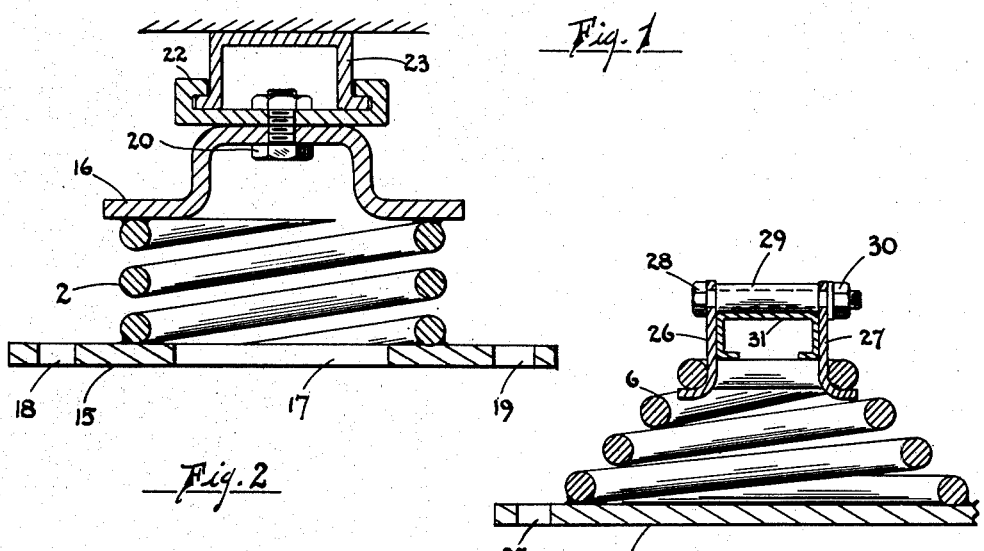
*Fig. 2*   *Fig. 3*
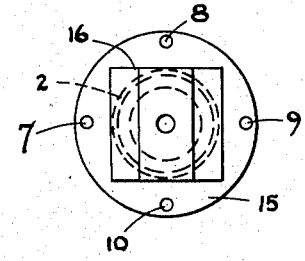   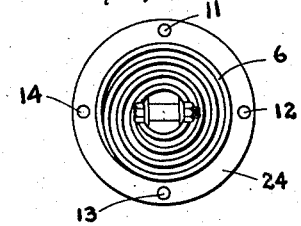
*Fig. 4*   *Fig. 5*
INVENTOR.
NATHAN WALKER
BY Harold J. Downes
ATTORNEY Patented May 11, 1954

2,678,082

UNITED STATES PATENT OFFICE 2,678,082

AUTOMOBILE SEAT SHOCK ABSORBING SYSTEM

Nathan Walker, Los Angeles, Calif.

Application December 9, 1952, Serial No. 324,931

1 Claim. (Cl. 155—9)

This invention relates to automobile seat and in particular to means for eliminating the effect of road shock and other low amplitude relatively high frequency vibration.

The conventional automobile seat springs are adequate to absorb much of the road shock due to small irregularities in the road surface, rocks, gravel, or pavement cracks when the seat is carried in a relatively heavy car. A heavy car has sufficient mass to absorb low amplitude high frequency shock without transmitting these vibrations to the passengers. However, in a light car the mass of the automobile is such that a fairly high proportion of the amplitude of these vibrations is transmitted through the wheels to the car and from the car to the passengers through the seat.

This invention contemplates a springing system applicable to the seat itself which provides insulation of the seat itself from much of the road shock experienced by and transmitted through the automobile.

It is therefore an object of this invention to provide an improved spring system for an automobile seat.

It is another object of this invention to provide an improved shock absorbing automobile seat.

It is another object of this invention to provide a shock absorbing system for a front seat of an automobile.

It is another object of this invention to provide a spring support for an automobile seat which is insensitive to acceleration and deceleration of the automobile.

Other objects of invention will become apparent from the following descriptions taken in connection with the accompanying drawings in which—

Fig. 1 is a plan view of the invention,

Fig. 2 is a sectional view of the invention taken at 2—2 in Fig. 1,

Fig. 3 is a sectional view of the invention taken at 3—3 in Fig. 1,

Fig. 4 is a plan view of the device shown in Fig. 2, and

Fig. 5 is a plan view of the device shown in Fig. 3.

Referring to the drawings, and in particular to Fig. 1, the automobile seat 1, is supported upon compression springs 2, 3, 4, 5 and 6. Springs 2, 3, 4 and 5 are cylindrical springs as shown in Fig. 2, while spring 6 is a helical spring as shown in Fig. 3. Springs 2, 3, 4, 5 and 6 are bolted to the floor of the automobile by bolts such as bolts 7, 8, 9, 10, 11, 12, 13 and 14, shown in Figs. 4 and 5.

Each of springs 2, 3, 4 and 5 is welded to a base plate 15 and to a cap plate 16. It will be noted that base plate 15 is annular in shape, having a central internal hole 17, and holes 18 to accommodate the bolts used to secure each spring to the floor of the automobile. Cap plate 16 is welded to spring 2 and has a centrally located hole through which lag screw 20 may be inserted in order to fasten the plate and spring to end seat support channel 22 which in turn slides upon channel 23 which is fixed to seat 1.

Spring 6 as shown in Fig. 3 is welded to base plate 24 which carries holes 25 for bolting the device to the floor of the automobile. Clamp members 26 and 27 fit the upper end of the spring as shown and are held together by bolt 28 working against spacer 29 and secured by nut 30. Central fore and aft channel 31 fits between clamp members 26 and 27 to afford the requisite fore and aft translatory freedom for the seat.

In operation, the four corner springs 2, 3, 4 and 5 support the greater portion of the load of seat 1 and are springs having substantially equivalent spring constants. With only these four springs, acceleration and deceleration of the automobile causes an undesirable rocking sensation to the seated passenger. With the addition of spring 6 however, stabilization is accomplished and the seat is securely anchored against rocking.

Fore and aft adjustment of seat position is accomplished by sliding channel 31 between clips 26 and 27 and channels 23 in channels 22.

There is thus provided a resilient seat spring support which permits fore and aft adjustment of the seat and which absorbs most of the high frequency, low amplitude road shock objectionable in a light car.

Although the invention has been described and illustrated in detail, the same is to be understood to be by way of illustration and example only, the spirit and scope of the invention being limited only by the terms of the appended claim.

I claim:

An automobile seat spring system comprising an automobile seat, a channel shaped member attached to the lower surface of each end of said seat and at the mid-portion thereof and oriented transversely thereof, a compression spring attached to the floor of said automobile beneath each corner of said seat and centrally beneath the aft portion thereof, a channel member attached to the pair of said springs at each end of said seat and slideable transversely on said channels fixed to said seat, and a clip device fixed to said central spring and slideably attached to said mid-portion channel, to thereby resiliently support said seat while permitting fore and aft adjustment thereof.

References Cited in the file of this patent

UNITED STATES PATENTS

| Number | Name | Date |
|---|---|---|
| 1,362,041 | Roe | Dec. 14, 1920 |
| 1,417,744 | Kent | May 30, 1922 |

FOREIGN PATENTS

| Number | Country | Date |
|---|---|---|
| 548,892 | Germany | Apr. 21, 1932 |